US006856743B2

(12) United States Patent
Bickham

(10) Patent No.: US 6,856,743 B2
(45) Date of Patent: Feb. 15, 2005

(54) NZDSF OPTICAL FIBER WITH LOW DISPERSION ZERO AND LOW SLOPE

(75) Inventor: Scott R. Bickham, Corning, NY (US)

(73) Assignee: Corning Incorporated, Corning, NY (US)

(*) Notice: Subject to any disclaimer, the term of this patent is extended or adjusted under 35 U.S.C. 154(b) by 204 days.

(21) Appl. No.: 10/308,243

(22) Filed: Dec. 2, 2002

(65) Prior Publication Data

US 2004/0105642 A1 Jun. 3, 2004

(51) Int. Cl.$^7$ .............................. G02B 6/02; G02B 6/22
(52) U.S. Cl. ..................................... 385/127; 385/123
(58) Field of Search ................................ 385/123–128, 385/141

(56) References Cited

U.S. PATENT DOCUMENTS

| | | | |
|---|---|---|---|
| 6,301,422 B1 | 10/2001 | Li ............................... | 385/127 |
| 6,317,551 B1 | 11/2001 | Mitchell et al. ............ | 385/124 |
| 6,701,053 B2 * | 3/2004 | Liu ............................. | 385/127 |
| 2002/0141719 A1 | 10/2002 | Liu ............................. | 385/127 |

FOREIGN PATENT DOCUMENTS

WO          WO01/11402          2/2001          ............ G02B/6/22

OTHER PUBLICATIONS

Luc B. Jeunhomme; "Single–Mode Fiber Optics Principles and Applications"; Optical Engineering/vol. 23; Second Edition; pp. 39–44.

* cited by examiner

Primary Examiner—Diane I. Lee
Assistant Examiner—Lisa M. Caputo
(74) Attorney, Agent, or Firm—Joseph M. Homa

(57) ABSTRACT

An optical waveguide fiber having an effective area of greater than about 60 $\mu m^2$ at a wavelength of about 1550 nm, a dispersion slope of less than 0.07 ps/nm$^2$/km at a wavelength of about 1550 nm, and a zero-dispersion wavelength of less than about 1500 nm. In preferred embodiments, the optical fiber has a mode field diameter greater than 9 $\mu m$ at 1550 nm and includes a first core region with a positive relative refractive index, a first annular core region with a positive relative refractive index, and a second annular core region having a negative refractive index, wherein the the second annular core region begins at a radius greater than the mode field diameter and ends at a radius less than about 2.5 times the mode field diameter. Cabled cutoff wavelengths are less than about 1300 nm.

18 Claims, 7 Drawing Sheets

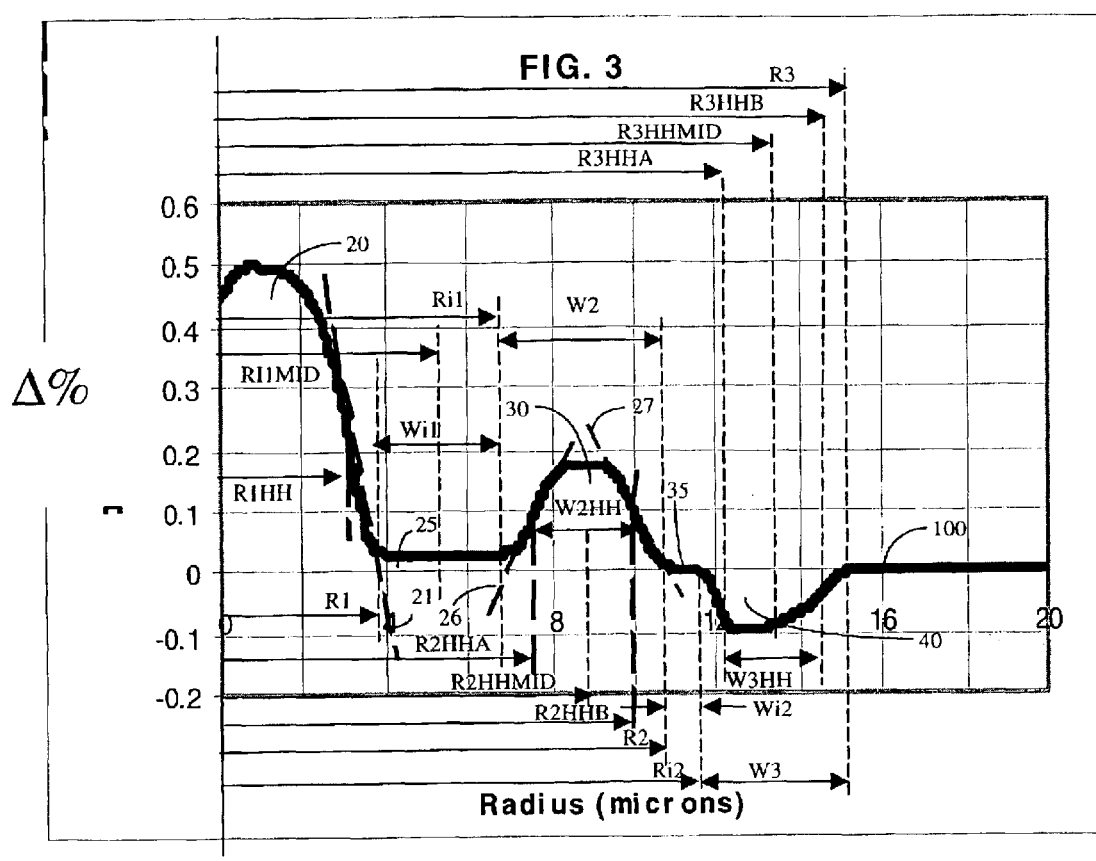

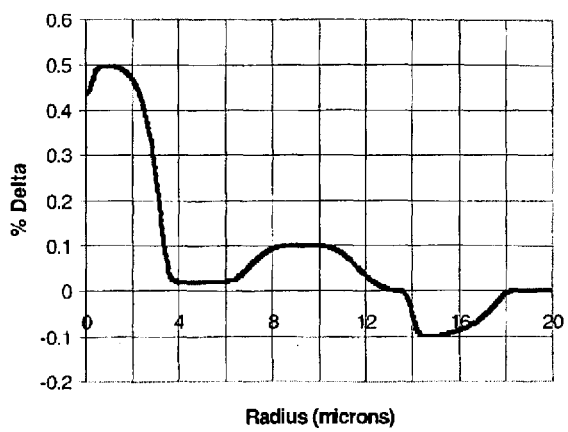
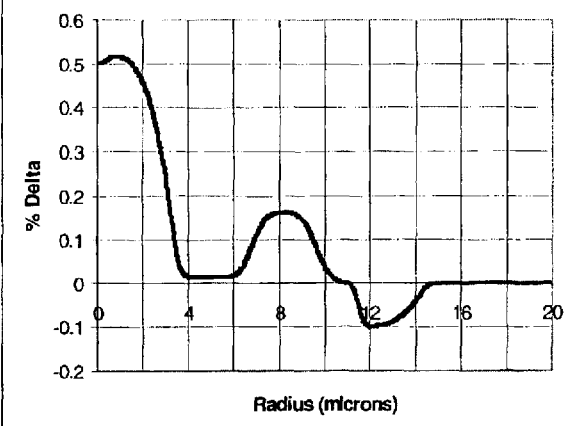
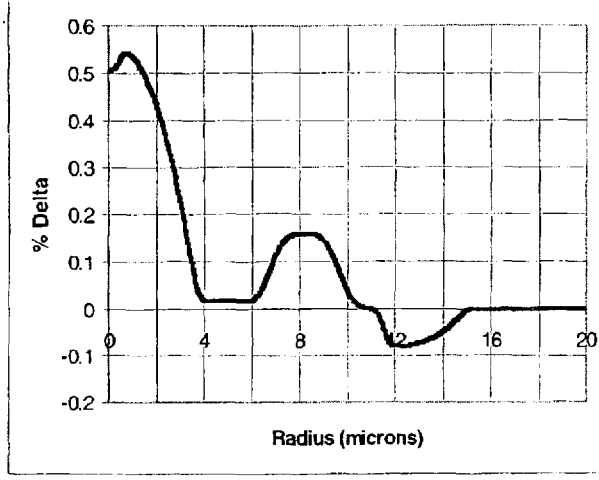

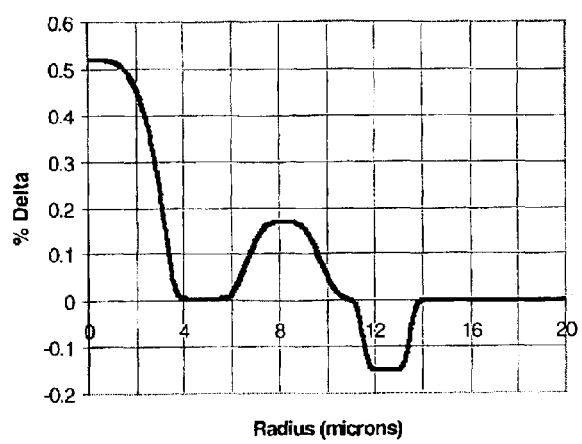
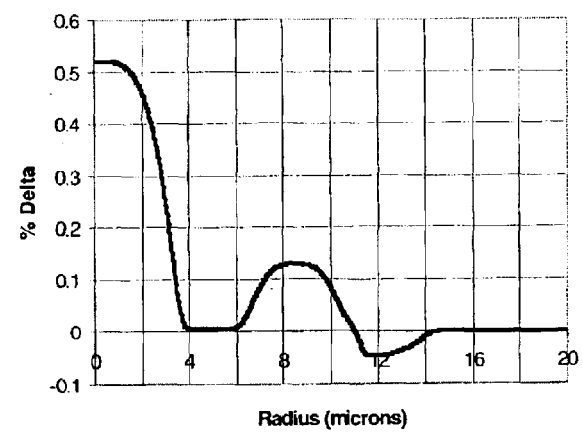
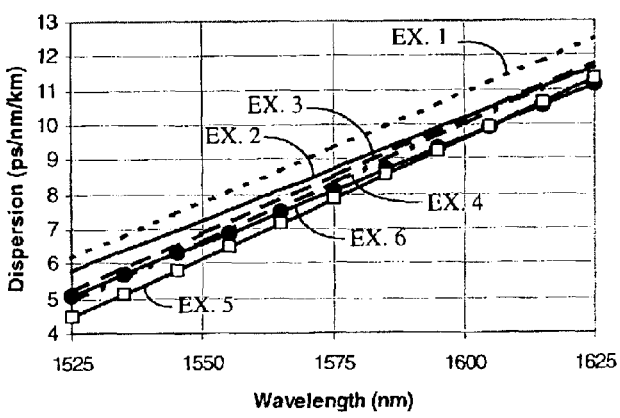

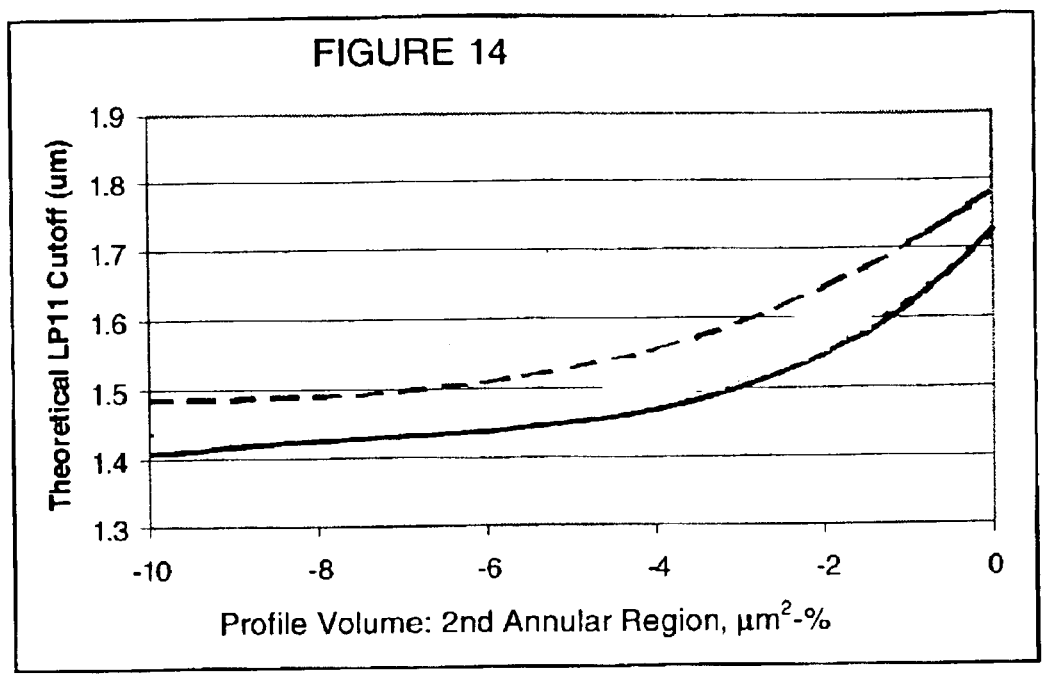

NZDSF OPTICAL FIBER WITH LOW DISPERSION ZERO AND LOW SLOPE

BACKGROUND OF THE INVENTION

1. Field of the Invention

The present invention relates to non-zero dispersion shifted optical fibers (NZDSF) having low slope. More preferably, the present invention relates to NZDSF fibers having large effective area, low slope and low zero dispersion wavelength.

2. Technical Background

Wavelength division multiplexing (WDM) systems have operated around the 1550 nm wavelength region, defined herein as including the C-band, which includes wavelengths between about 1525 nm to about 1565, and the L-band, which includes wavelengths between about 1565 nm to about 1625 nm. Some known fibers have a zero dispersion wavelength located outside the operation window which may help prevent nonlinear penalties such as four-wave mixing (FWM) and cross-phase modulation (XPM). However, the zero dispersion wavelength of known NZDSF fibers is typically within 100 nm of 1550 nm in order to reduce the magnitude of the dispersion of a transmitted signal in the 1550 nm operating window so as to allow longer span lengths and less frequent dispersion compensation.

Preferably, coarse wavelength division multiplexing (CWDM) systems and applications operate in the WDM 1550 nm window, i.e. in the C-and L-bands, in the S-band (between about 1450 nm and about 1525 nm), and in the 1310 nm window (between about 1280 nm and about 1330 nm).

Known fibers have optical characteristics which are suitable for operation in specific windows. For example, standard single mode transmission fibers, such as the SMF-28® optical fiber manufactured by Corning Incorporated, have a zero dispersion wavelength at or near 1310 nm, and such fibers can perform suitably in the 1310 nm window. The dispersion exhibited by such optical fiber at 1550 nm is around 17 ps/nm/km, which is larger than the dispersion at 1550 nm of typical NZDSF fiber, and which can require frequent dispersion compensation. NZDSF optical fiber can perform suitably in the 1550 nm window. Examples of NZDSF fiber include: LEAF® fiber by Corning Incorporated which has an average zero dispersion wavelength near 1500 nm and a dispersion slope of about 0.08 ps/nm/km at about 1550 nm, Submarine LEAF® fiber by Corning Incorporated which has an average zero dispersion wavelength near 1590 nm and a dispersion slope of about 0.1 ps/nm/km at about 1550 nm, MetroCor™ fiber by Corning Incorporated which has a zero dispersion wavelength near 1650 nm, and Truewave RS™ fiber by Lucent Corporation which has a zero dispersion wavelength of about 1450 nm. However, the magnitude of the dispersion in the 1310 nm window of these NZDSF optical fibers is not low, and many NZDSF fibers have specified cable cutoff wavelengths which are greater than 1260 nm.

SUMMARY OF THE INVENTION

An optical waveguide fiber is disclosed herein comprising a central region extending radially outward from the centerline and having a positive relative refractive index percent, $\Delta_1\%(r)$ with a maximum relative refractive index percent, $\Delta_{1,MAX}$; a first annular region surrounding the central region and having a positive relative refractive index percent, $\Delta_2\%(r)$, with a maximum relative refractive index percent, $\Delta_{2,MAX}$; a second annular region surrounding the first annular region and having a negative relative refractive index percent, $\Delta_3\%(r)$ with a minimum relative refractive index percent, $\Delta_{3,MIN}$, the second annular region extending from an inner radius, $R_{3A}$, to an outer radius, $R_3$; and an outer annular cladding region surrounding the second annular region and having a relative refractive index percent, $\Delta_c\%(r)$; wherein the mode field diameter at 1550 nm is greater than 9 $\mu$m; wherein the inner radius of the second annular region, $R_{3A}$, is greater than the mode field diameter at 1550 nm; wherein the outer radius of the second annular region, $R_3$, is less than or equal to 2.5 times the mode field diameter at 1550 nm; and wherein the optical fiber has an effective area of greater than about 60 $\mu m^2$ at a wavelength of about 1550 nm, a dispersion at a wavelength of about 1550 nm between about 4 ps/nm-km and 10 ps/nm-km, a dispersion slope of less than 0.07 ps/nm$^2$/km at a wavelength of about 1550 nm, and a zero-dispersion wavelength of less than about 1500 nm.

Preferably, the outer radius of the second annular region, $R_3$, is less than or equal to 2.5 times the mode field diameter at 1550 nm.

Preferably, $\Delta_1\%(r)$ has an alpha profile shape with an alpha less than 8.

Preferably, $\Delta_{1,MAX} > \Delta_{2,MAX} \geq 0 > \Delta_{3,MIN}$, and even more preferably $\Delta_{1,MAX} > \Delta_{2,MAX} > 0 > \Delta_{3,MIN}$.

Preferably, $\Delta_{2,MAX} < 0.4\%$.

In one set of preferred embodiments, the optical waveguide fiber disclosed herein comprises: a central region extending radially outward from the centerline and having a positive relative refractive index percent, $\Delta_1\%(r)$ with a maximum relative refractive index percent, $\Delta_{1,MAX}$, wherein $\Delta_1\%(r)$ has an alpha profile shape with an alpha less than 8; a first annular region surrounding the central region and having a positive relative refractive index percent, $\Delta_2\%(r)$, with a maximum relative refractive index percent, $\Delta_{2,MAX}$, less than 0.4%; a second annular region surrounding the first annular region and having a negative relative refractive index percent, $\Delta_3\%(r)$ with a minimum relative refractive index percent, $\Delta_{3,MIN}$, the second annular region extending from an inner radius, $R_{3A}$, to an outer radius, $R_3$; and an outer annular cladding region surrounding the second annular region and having a relative refractive index percent, $\Delta_c\%(r)$; wherein the mode field diameter at 1550 nm is greater than 9 $\mu$m; wherein the inner radius of the second annular region, $R_{3A}$, is greater than the mode field diameter at 1550 nm; wherein the outer radius of the second annular region, $R_3$, is less than or equal to 2.5 times the mode field diameter at 1550 nm.

In another set of preferred embodiments, the optical waveguide fiber disclosed herein comprises: a central region extending radially outward from the centerline and having a positive relative refractive index percent, $\Delta_1\%(r)$ with a maximum relative refractive index percent, $\Delta_{1,MAX}$; a first annular region surrounding the central region and having a positive relative refractive index percent, $\Delta_2\%(r)$, with a maximum relative refractive index percent, $\Delta_{2,MAX}$; a second annular region surrounding the first annular region and having a negative relative refractive index percent, $\Delta_3\%(r)$ with a minimum relative refractive index percent, $\Delta_{3,MIN}$, the second annular region extending from an inner radius, $R_{3A}$, to an outer radius, $R_3$; and an outer annular cladding region surrounding the second annular region and having a relative refractive index percent, $\Delta_c\%(r)$; wherein the mode field diameter at 1550 nm is greater than 9 μm; wherein the inner radius of the second annular region, $R_{3A}$, is greater than the mode field diameter at 1550 nm; wherein the outer radius of the second annular region, $R_3$, is less than or equal to 2.5 times the mode field diameter at 1550 nm; wherein the profile volume of the second annular region is between about $-2\%$-μm$^2$ and about $-6\%$-μm$^2$; and wherein the optical fiber has a dispersion at a wavelength of about 1550 nm between about 4 ps/nm-km and 10 ps/nm-km, a dispersion slope of less than 0.07 ps/nm-km at a wavelength of about 1550 nm, and a zero-dispersion wavelength of less than about 1500 nm.

In some preferred embodiments, the optical fiber further comprises a first intermediate annular region disposed between the central region and the first annular region and having a relative refractive index percent, $\Delta_{i1}\%(r)$, with a maximum absolute value of the relative refractive index percent, $|\Delta_{i1}|_{max}$, wherein $|\Delta_{i1}|_{max}<0.1\%$, and wherein first intermediate annular region abuts both the central region and the first annular region.

The first annular region preferably has a width of less than about 5 μm.

The first intermediate annular region preferably extends to a radius of between about 5 μm and about 8 μm.

Preferably, $|\Delta_{i1,MAX}|<0.05\%$.

The first intermediate annular region preferably has a non-negative relative refractive index percent, more preferably the first intermediate annular region has a positive relative refractive index percent.

Preferably, $\Delta_{1,MAX}>\Delta_{2,MAX}>0$.

In preferred embodiments, $\Delta_{1,MAX}$ is between about 0.40% and about 0.60%.

The central region preferably extends to a radius of between about 3 μm and about 5 μm. Preferably, the first annular region extends to a radius of between about 10 μm and about 14 μm.

Preferably, $-0.2\%<\Delta_{3,MIN}<-0.05\%$.

The profile volume of the second annular region is preferably between about $-2\%$-μm$^2$ and about $-6\%$-μm$^2$.

Preferably, the optical fiber has a dispersion at a wavelength of about 1550 nm of between about 5 ps/nm/km and about 9 ps/nm/km, and the optical fiber has a dispersion slope of less than 0.07 ps/nm$^2$/km at a wavelength of about 1550 nm.

In some preferred embodiments, the optical fiber has a zero-dispersion wavelength of less than about 1500 nm. In other preferred embodiments, the optical fiber has a zero-dispersion wavelength of less than about 1450 nm.

In some preferred embodiments, the optical fiber further comprises a second intermediate annular region disposed between the first annular region and the second annular region and having a relative refractive index percent, $\Delta_{i2}\%(r)$, with a maximum absolute value of the relative refractive index percent, $|\Delta_{i2,MAX}|$, wherein $|\Delta_{i2,MAX}|<0.1\%$, and wherein the second intermediate annular region abuts both the first annular region and the second annular region. Preferably, the second intermediate annular region has a width of less than about 4 μm.

Reference will now be made in detail to the present preferred embodiments of the invention, examples of which are illustrated in the accompanying drawings. An exemplary embodiment of a segmented core refractive index profile in accordance with the present invention is shown in each of the figures.

BRIEF DESCRIPTION OF THE DRAWINGS

FIG. 3 shows a refractive index profile corresponding to a preferred embodiment of an optical waveguide fiber as disclosed herein;

FIG. 4 shows a refractive index profile corresponding to another preferred embodiment of an optical waveguide fiber as disclosed herein;

FIG. 5 shows a refractive index profile corresponding to another preferred embodiment of an optical waveguide fiber as disclosed herein;

FIG. 6 shows a refractive index profile corresponding to another preferred embodiment of an optical waveguide fiber as disclosed herein;

FIG. 7 shows a refractive index profile corresponding to another preferred embodiment of an optical waveguide fiber as disclosed herein;

FIG. 8 shows a refractive index profile corresponding to another preferred embodiment of an optical waveguide fiber as disclosed herein;

FIG. 9 is a schematic cross-sectional view of a preferred embodiment of an optical waveguide fiber as disclosed herein;

FIG. 14 shows the theoretical LP11 wavelength cutoff (in μm) for the various embodiments represented in FIG. 13.

DETAILED DESCRIPTION OF THE PREFERRED EMBODIMENT

Figure 1:
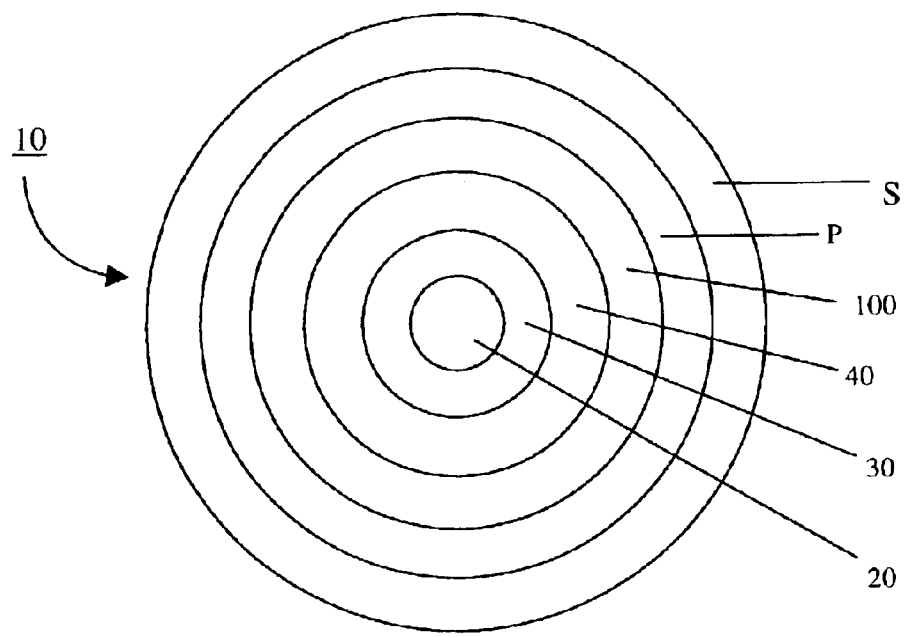
FIG. 1 is a schematic cross-sectional view of a preferred embodiment of an optical waveguide fiber as disclosed herein.

Additional features and advantages of the invention will be set forth in the detailed description which follows and will be apparent to those skilled in the art from the description or recognized by practicing the invention as described in the following description together with the claims and appended drawings.

The "refractive index profile" is the relationship between refractive index or relative refractive index and optical waveguide fiber radius.

The "relative refractive index percent" is defined as $\Delta\% = 100 \times (n_i^2 - n_c^2)/2n_i^2$, where $n_i$ is the maximum refractive index in region i, unless otherwise specified, and $n_c$ is the average refractive index of the cladding region. In cases where the refractive index of an annular region or a segment is less than the average refractive index of the cladding region, the relative index percent is negative and is referred to as having a depressed region or depressed index. In cases where the refractive index of an annular region or a segment is greater than the average refractive index of the cladding region, the relative index percent is positive and the region can be said to be raised or to have a positive index. A "downdopant" is herein considered to be a dopant which has a propensity to lower the refractive index relative to pure undoped $SiO_2$. A downdopant may be present in a region of an optical fiber having a positive relative refractive index when accompanied by one or more other dopants which are not downdopants. Likewise, one or more other dopants which are not downdopants may be present in a region of an optical fiber having a negative relative refractive index.

"Chromatic dispersion", herein referred to as "dispersion" unless otherwise noted, of a waveguide fiber is the sum of the material dispersion, the waveguide dispersion, and the inter-modal dispersion. In the case of single mode waveguide fibers the inter-modal dispersion is zero.

"Effective area" is defined as:

$$A_{eff}=2\pi(\int E^2 r\, dr)^2/(\int E^4 r\, dr),$$

where the integration limits are 0 to ∞, and E is the electric field associated with light propagated in the waveguide.

The term "α-profile" or "alpha profile" refers to a refractive index profile, expressed in terms of $\Delta(r)\%$, where r is radius, which follows the equation, $$\Delta(r)\%=\Delta(r_o)(1-[|r-r_o|/(r_1-r_o)]^\alpha),$$

where $r_o$ is the point at which $\Delta(r)\%$ is maximum, $r_1$ is the point at which $\Delta(r)\%$ is zero, and r is in the range $r_i \leq r \leq r_f$, where Δ is defined above, $r_i$ is the initial point of the α-profile, $r_f$ is the final point of the α-profile, and α is an exponent which is a real number.

The mode field diameter (MFD) is measured using the Peterman II method wherein, 2w=MFD, and $w^2=(2\int E^2\, r\, dr/\int [dE/dr]^2\, r\, dr)$, the integral limits being 0 to ∞.

The bend resistance of a waveguide fiber can be gauged by induced attenuation under prescribed test conditions.

One type of bend test is the lateral load microbend test. In this so-called "lateral load" test, a prescribed length of waveguide fiber is placed between two flat plates. A #70 wire mesh is attached to one of the plates. A known length of waveguide fiber is sandwiched between the plates and a reference attenuation is measured while the plates are pressed together with a force of 30 newtons. A 70 newton force is then applied tot he plates and the increase in attenuation in dB/m is measured. The increase in attenuation is the lateral load attenuation of the waveguide.

The "pin array" bend test is used to compare relative resistance of waveguide fiber to bending. To perform this test, attenuation loss is measured for a waveguide fiber with essentially no induced bending loss. The waveguide fiber is then woven about the pin array and attenuation again measured. The loss induced by bending is the difference between the two measured attenuations. The pin array is a set of ten cylindrical pins arranged in a single row and held in a fixed vertical position on a flat surface. The pin spacing is 5 mm, center to center. The pin diameter is 0.67 mm. During testing, sufficient tension is applied to make the waveguide fiber conform to a portion of the pin surface.

The theoretical fiber cutoff wavelength, or "theoretical fiber cutoff", or "theoretical cutoff", for a given mode, is the wavelength above which guided light cannot propagate in that mode. A mathematical definition can be found in Single Mode Fiber Optics, Jeunhomme, pp. 39–44, Marcel Dekker, New York, 1990 wherein the theoretical fiber cutoff is described as the wavelength at which the mode propagation constant becomes equal to the plane wave propagation constant in the outer cladding. This theoretical wavelength is appropriate for an infinitely long, perfectly straight fiber that has no diameter variations.

The effective fiber cutoff is lower than the theoretical cutoff due to losses that are induced by bending and/or mechanical pressure. In this context, the cutoff refers to the higher of the LP11 and LP02 modes. LP11 and LP02 are generally not distinguished in measurements, but both are evident as steps in the spectral measurement, i.e. no power is observed in the mode at wavelengths longer than the measured cutoff. The actual fiber cutoff can be measured by the standard 2 m fiber cutoff test, FOTP-80 (EIA-TIA-455-80), to yield the "fiber cutoff wavelength", also known as the "2 m fiber cutoff" or "measured cutoff". The FOTP-80 standard test is performed to either strip out the higher order modes using a controlled amount of bending, or to normalize the spectral response of the fiber to that of a multimode fiber.

The cabled cutoff wavelength, or "cabled cutoff" is even lower than the measured fiber cutoff due to higher levels of bending and mechanical pressure in the cable environment. The actual cabled condition can be approximated by the cabled cutoff test described in the EIA-445 Fiber Optic Test Procedures, which are part of the EIA-TIA Fiber Optics Standards, that is, the Electronics Industry Alliance—Telecommunications Industry Association Fiber Optics Standards, more commonly known as FOTP's. Cabled cutoff measurement is described in EIA-455-170 Cable Cutoff Wavelength of Single-mode Fiber by Transmitted Power, or "FOTP-170".

A waveguide fiber telecommunications link, or simply a link, is made up of a transmitter of light signals, a receiver of light signals, and a length of waveguide fiber or fibers having respective ends optically coupled to the transmitter and receiver to propagate light signals therebetween. The length of waveguide fiber can be made up of a plurality of shorter lengths that are spliced or connected together in end to end series arrangement. A link can include additional optical components such as optical amplifiers, optical attenuators, optical fiber isolators, optical switches, optical filters, or multiplexing or demultiplexing devices. One may denote a group of inter-connected links as a telecommunications system.

A span of optical fiber as used herein includes a length of optical fiber, or a plurality of optical fibers fused together serially, extending between optical devices, for example between two optical amplifiers, or between a multiplexing device and an optical amplifier. A span may comprise one or more sections of optical fiber as disclosed herein, and may further comprise one or more sections of other optical fiber, for example as selected to achieve a desired system performance or parameter such as residual dispersion at the end of a span.

Generally, the "physical" core of optical fiber comprises one or more segments which may be doped. The segments are physically identifiable portions of the core. At the same time, it should be understood that, optically speaking, the "optical" core is considered herein to be where about 99% of the propagated light travels within the optical fiber, wherein a portion of the propagated light could travel outside a physical core segment.

Preferably, the fibers disclosed herein are made by a vapor deposition process. Even more preferably, the fibers disclosed herein are made by an outside vapor deposition (OVD) process. Thus, for example, known OVD laydown, consolidation, and draw techniques may be advantageously used to produce the optical waveguide fiber disclosed herein. Other processes, such as modified chemical vapor deposition (MCVD) or vapor axial deposition (VAD) may be used. Thus, the refractive indices and the cross sectional profile of the optical waveguide fibers disclosed herein can be accomplished using manufacturing techniques known to those skilled in the art including, but in no way limited to, OVD, VAD and MCVD processes.

FIG. 1 is a schematic representation (not to scale) of an optical waveguide fiber 10 in accordance with the present invention having a central region (or first core segment) 20, a first annular region (or second core segment) 30 immediately adjacent and surrounding the central region 20, a second annular region (or third core segment) 40 immediately adjacent and surrounding the first annular region 30, and an outer annular cladding region or cladding or clad layer 100 immediately adjacent and surrounding the second annular region 40.

Preferably, the cladding 100 of the optical fiber 10 disclosed herein is pure or substantially pure silica. More preferably, the cladding contains no germania or fluorine dopants therein. The outer annular cladding region 100 may be comprised of a cladding material which was deposited, for example during a laydown process, or which was provided in the form of a jacketing, such as a tube in a rod-in-tube optical preform arrangement, or a combination of deposited material and a jacket. The outer annular cladding region 100 may include one or more dopants. The cladding 100 is preferably surrounded by a primary coating P and a secondary coating S. The refractive index of the cladding 100 is used to calculate the relative refractive index percentage as discussed elsewhere herein.

Referring to FIG. 1, the clad layer 100 has a refractive index of $n_c$ surrounding the core which is defined to have a $\Delta\%(r)=0$, which is used to calculate the refractive index percentage of the various portions or regions of an optical fiber or optical fiber preform.

In describing the profile of a region such as the central core region or central region, a half maximum point can be defined by determining a peak refractive index or maximum relative index, such as $\Delta_{1,MAX}$, and determining what radius corresponds to a relative refractive index which is equal to one-half the value of the peak refractive index or maximum relative index, such as $\Delta_{1,MAX}$, i.e. where a vertical line depending from the curve describing the relative refractive index versus radius intersects with the axis corresponding to $\Delta\%(r)=0$, i.e. the relative refractive index of the clad layer.

Figure 2:
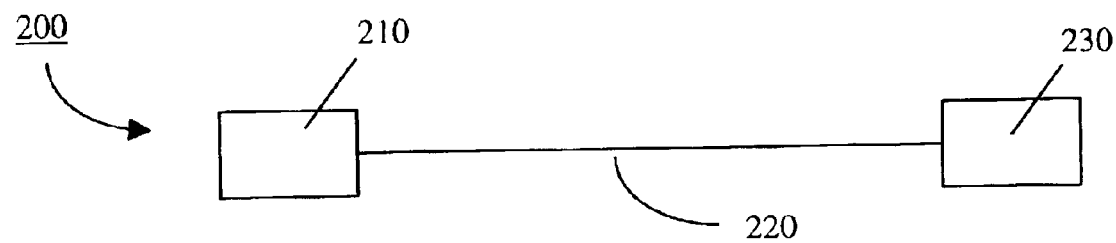
FIG. 2 is a schematic view of a fiber optic communication system employing an optical fiber of the present invention.

As shown in FIG. 2, an optical fiber communication system 200 comprises an optical fiber 220 as disclosed herein. System 200 includes a transmitter 210 and a receiver 230, wherein optical fiber 220 allows transmission of an optical signal between transmitter 210 and receiver 230. System 200 is preferably capable of 2-way communication, and transmitter 210 and receiver 230 are shown for illustration only. The system 200 preferably includes a link which has a section or a span of optical fiber as disclosed herein. The system 200 may also include one or more optical devices optically connected to one or more sections or spans of optical fiber as disclosed herein, such as one or more regenerators, amplifiers, or dispersion compensating modules. In at least one preferred embodiment, an optical fiber communication system according to the present invention comprises a transmitter and receiver connected by an optical fiber without the presence of a regenerator therebetween. In another preferred embodiment, an optical fiber communication system according to the present invention comprises a transmitter and receiver connected by an optical fiber without the presence of an amplifier therebetween. In yet another preferred embodiment, an optical fiber communication system according to the present invention comprises a transmitter and receiver connected by an optical fiber having neither an amplifier nor a regenerator nor a repeater therebetween.

Preferably, the optical fibers disclosed herein have a low water content, and preferably are low water peak optical fibers, i.e. having an attenuation curve which exhibits a relatively low, or no, water peak in a particular wavelength region, especially the 1383 nm window.

A soot preform or soot body can be formed by chemically reacting at least some of the constituents of a moving fluid mixture including at least one glass-forming precursor compound in an oxidizing medium to form a silica-based reaction product. At least a portion of this reaction product is directed toward a substrate, to form a porous silica body, at least a portion of which typically includes hydrogen bonded to oxygen. The soot body may be formed, for example, by depositing layers of soot onto a bait rod via an OVD process.

A substrate or bait rod or mandrel is inserted through a glass body such as hollow or tubular handle and mounted on a lathe. The lathe is designed to rotate and translate the mandrel in close proximity with a soot-generating burner. As the mandrel is rotated and translated, silica-based reaction product, known generally as soot, is directed toward mandrel. At least a portion of silica-based reaction product is deposited on the mandrel and on a portion of a glass handle to form a soot body thereon.

Once the desired quantity of soot has been deposited on the mandrel, soot deposition is terminated and the mandrel is removed from the soot body.

Upon removal of the mandrel, the soot body defines a centerline hole passing axially therethrough. Preferably, the soot body is suspended by a handle on a downfeed device and positioned within a consolidation furnace. The end of the centerline hole remote from the handle is preferably fitted with a bottom plug prior to positioning the soot body within the consolidation furnace. Preferably, the bottom plug is positioned and held in place with respect to the soot body by friction fit. The plug is further preferably tapered to facilitate entry and to allow at least temporary affixing, and at least loosely, within the soot body.

The soot body is preferably chemically dried, for example, by exposing the soot body to a chlorine-containing atmosphere at elevated temperature within a consolidation furnace. A chlorine-containing atmosphere effectively removes water and other impurities from the soot body, which otherwise would have an undesirable effect on the properties of optical waveguide fiber manufactured from soot body. In an OVD formed soot body, the chlorine flows sufficiently through the soot to effectively dry the entire blank, including the centerline region surrounding the centerline hole.

Following the chemical drying step, the temperature of the furnace is elevated to a temperature sufficient to consolidate the soot blank into a sintered glass preform, preferably about 1500° C. The centerline hole is then closed during the consolidation step so that the centerline hole does not have an opportunity to be rewet by a hydrogen compound prior to centerline hole closure. Preferably, the centerline region has a weighted average OH content of less than about 1 ppb.

Exposure of the centerline hole to an atmosphere containing a hydrogen compound can thus be significantly reduced or prevented by closing the centerline hole during consolidation.

A glass body such as a bottom plug is positioned in the centerline hole at the end of the soot body remote from the handle, and a glass body such as hollow tubular glass plug or top plug having a open end is positioned in the centerline hole in the soot body opposite the plug. The top plug can be disposed within a cavity of a tubular handle. Following chlorine drying, the soot body is down driven into the hot zone of the consolidation furnace to seal the centerline hole and consolidate the soot body into a sintered glass preform or consolidated glass preform. Drying and consolidation may optionally occur simultaneously. During consolidation, the soot body contracts somewhat and engages the bottom plug and the lower end of the top plug, thereby fusing the resulting sintered glass preform to the plugs and sealing the centerline hole. Sealing of both the top and bottom of the centerline hole can be accomplished with one pass of the soot body through the hot zone. Preferably, the consolidated glass preform or sintered glass preform is held at an elevated temperature, preferably in a holding oven, to allow inert gas to diffuse from the centerline hole to form a passive vacuum within the sealed centerline hole. Preferably, the top plug has a relatively thin wall through which diffusion of the inert gas can more expediently occur. The top plug preferably has an enlarged portion for supporting the plug within the handle, and a narrow portion extending into the centerline hole of the soot body. The top plug also preferably includes an elongated hollow portion which may preferably occupy a substantial portion of the handle. The hollow portion provides additional volume to the centerline hole thereby providing a better vacuum within the centerline hole following diffusion of the inert gas. The volume provided by the elongated portion of the plug provides added volume to sealed centerline hole.

As described above and elsewhere herein, the bottom plug and top plug are preferably glass bodies having a water content of less than about 31 ppm by weight, such as fused quartz plugs, and preferably less than 5 ppb by weight, such as chemically dried silica plugs. Typically, such plugs are dried in a chlorine-containing atmosphere, but an atmosphere containing other chemical drying agents are equally applicable. Ideally, the glass plugs will have a water content of less than 1 ppb by weight. In addition, the glass plugs are preferably thin walled plugs ranging in thickness from about 200 $\mu$m to about 2 mm. Even more preferably, at least a portion of plug 60 has a wall thickness of about 0.2 to about 0.5 mm. More preferably still, elongated portion 66 has a wall thickness of about 0.3 mm to about 0.4 mm. Thinner walls promote diffusion, but are more susceptible to breakage during handling.

Thus, inert gas is preferably diffused from the centerline hole after the centerline hole has been sealed to create a passive vacuum within the centerline hole, and thin walled glass plugs can facilitate rapid diffusion of the inert gas from the centerline hole. The thinner the plug, the greater the rate of diffusion. A consolidated glass preform is preferably heated to an elevated temperature which is sufficient to stretch the glass preform, preferably about 1950° C. to about 2100° C., and thereby reduce the diameter of the preform to form a cylindrical glass body, such as a core cane or an optical fiber, wherein the centerline hole collapses to form a solid centerline region. The reduced pressure maintained within the sealed centerline hole created passively during consolidation is generally sufficient to facilitate complete centerline hole closure during the draw (or so-called redraw) process.

Consequently, overall lower O—H overtone optical attenuation can be achieved. For example, the water peak at 1383 nm, as well as at other OH induced water peaks, such as at 950 nm or 1240 nm, can be lowered, and even virtually eliminated.

A low water peak generally provides lower attenuation losses, particularly for transmission signals between about 1340 nm and about 1470 nm. Furthermore, a low water peak also affords improved pump efficiency of a pump light emitting device which is optically coupled to the optical fiber, such as a Raman pump or Raman amplifier which may operate at one or more pump wavelengths. Preferably, a Raman amplifier pumps at one or more wavelengths which are about 100 nm lower than any desired operating wavelength or wavelength region. For example, an optical fiber carrying an operating signal at wavelength of around 1550 nm may be pumped with a Raman amplifier at a pump wavelength of around 1450 nm. Thus, the lower fiber attenuation in the wavelength region from about 1400 nm to about 1500 nmn would tend to decrease the pump attenuation and increase the pump efficiency, e.g. gain per mW of pump power, especially for pump wavelengths around 1400 nm. Generally, for greater OH impurities in a fiber, the water peak grows in width as well as in height. Therefore, a wider choice of more efficient operation, whether for operating signal wavelengths or amplification with pump wavelengths, is afforded by the smaller water peak. Thus, reducing OH impurities can reduce losses between, for example, for wavelengths between about 1260 nm to about 1650 nm, and in particular reduced losses can be obtained in the 1383 nm water peak region thereby resulting in more efficient system operation.

The fibers disclosed herein exhibit low PMD values when fabricated with OVD processes. Spinning of the optical fiber may also lower PMD values for the fiber disclosed herein.

Referring to FIG. 3, an optical waveguide fiber 10 disclosed herein preferably comprises: a central region 20 extending radially outwardly from the centerline to a central region outer radius, $R_1$, and having a positive relative refractive index percent, $\Delta_1\%(r)>0$ with a maximum relative refractive index percent, $\Delta_{1,MAX}$; a first annular region 30 surrounding the central region 20, having a width $W_2$ disposed at a midpoint, and having a positive relative refractive index percent, $\Delta_2\%(r)>0$, with a maximum relative refractive index percent, $\Delta_{2,MAX}$; a second annular region 40 surrounding the first annular region 30, having a width $W_3$ disposed at a midpoint, and having a negative relative refractive index percent, $\Delta_3\%(r)<0$, with a minimum relative refractive index percent, $\Delta_{3,MIN}$; and an outer annular cladding region 100 surrounding the second annular region 40 and preferably immediately adjacent thereto and having a relative refractive index percent, $\Delta_c\%(r)$. Preferably, $\Delta_{1,MAX}>\Delta_{2,MAX}\geq 0>\Delta_{3,MIN}$.

The central region 20 extends from the centerline of the fiber (r=0) to the central core region outer radius, $R_1$. $R_{1HH}$ marks the radius of the half-height, or half-peak height, that occurs radially outwardly of $\Delta_{1,MAX}$. The end of central region 20, $R_1$, is defined herein to start at a radius where a straight line approximation, indicated by line 21 which passes tangentially through the half-peak height of central region 20 and is extrapolated to intersect with the $\Delta\%=0$ axis.

The first annular region 30 may be disposed immediately adjacent the central region 20 in which case the first annular region 30 would begin at $R_1$. The central region 20 and the immediately adjacent first annular region 30 may together define a profile shape that comprises a center region with a side core or pedestal.

Preferably, the central region 20 and the first annular region 30 are not immediately adjacent to one another and the optical fiber further comprises a first intermediate annular region 25 disposed between region 20 and region 30, wherein the region 25 preferably begins at $R_1$ and ends at an outer radius $R_{i1}$. Preferably, the first intermediate annular region 25 is immediately adjacent the first annular region 30 at $R_{i1}$. In preferred embodiments, the first intermediate annular region 25 has a width $W_{i1}$ disposed at a midpoint $R_{i1MID}$, and has a relative refractive index percent, $\Delta_{i1}\%(r)$, with a maximum absolute value of the relative refractive index percent, $|\Delta_{i1}|_{max}$ which is preferably less than 0.1%, even more preferably less than 0.05%. Thus, $\Delta_{i1}\%(r)$ may be positive, negative or zero. Preferably, $\Delta_{i1}\%(r)$ is non-negative, and even more preferably is positive.

For a first annular region 30 having a profile shape which includes a relative refractive index value which is at least half of $\Delta_{2,MAX}$ disposed radially inwardly from the occurrence of $\Delta_{2,MAX}$, the radius $R_{2HHA}$ marks the first radially inward, or centermost, occurrence of the half-height of $\Delta_{2,MAX}$. $R_{2HHB}$ marks the first radially outward occurrence of the half-height of $\Delta_{2,MAX}$. The ring half-height peak width W2HH is bounded by inner and outer radii, $R_{2HHA}$ and $R_{2HHB}$, respectively. The midpoint of the ring half-height peak width W2HH occurs at a radius $R_{2HHMID}$. Preferably, $\Delta_{2,MAX}$ occurs at $R_{2HHMID}$. Preferably, $R_{2HHMID}$ coincides with the middle of the first annular region 30. In preferred embodiments in which the first annular region 30 is not immediately adjacent the central region 20, the first annular region 30 is defined to start at a radius where a straight line approximation, indicated by line 26 which passes tangentially through the first radially inward half-peak height $R_{2HHA}$ is extrapolated to intersect with the $\Delta\%=0$ axis, preferably at radius $R_{i1}$. The first annular region 30 is defined to end at a radius $R_2$ where a straight line approximation, indicated by line 27 which passes tangentially through the first radially outward half-peak height $R_{2HHB}$ is extrapolated to intersect with the $\Delta\%=0$ axis, or, if such straight line approximation yields a relative refractive index value for the region 30 which might be negative, then the first annular region 30 is defined to end at a radius $R_2$ which is just less than the radius where the relative refractive index value becomes negative.

In preferred embodiments, the first annular region 30 extends from $R_{2A}$ to $R_2$. The width $W_2$ is defined as the radial distance between $R_{2A}$ and $R_2$, where $R_{2A}=R_1$ for embodiments with no first intermediate annular region, or where $R_{2A}=R_{i1}$ for embodiments with a first intermediate annular region, so that $W_2=R_2-R_{2A}$ (i.e. $W_2=R_2-R_1$ or $W_2=R_2-R_{i1}$ respectively). The midpoint $R_{2MID}$ preferably occurs in the middle of $R_{2A}$ and $R_2$.

The second annular region 40 is defined to begin at the radius $R_{3A}$ where the relative refractive index becomes negative and which is greater than or equal to $R_2$. The second annular region 40 is defined to end at a radius $R_3$ where the relative refractive index becomes zero and which is greater than the radius at which $\Delta_{3,MIN}$ occurs. $R_{3HHA}$ marks the first radially inward, or centermost, occurrence of the half-height of $\Delta_{3,MIN}$. $R_{3HHB}$ marks the first radially outward occurrence of the half-height of $\Delta_{3,MIN}$. The second annular region half-height peak width W3HH is bounded by inner and outer radii, $R_{3HHA}$ and $R_{3HHB}$, respectively. The midpoint of the second annular region half-height peak width W3HH occurs at a radius $R_{3HHMID}$. Preferably $\Delta_3\%$ is not symmetric within the second annular region 40. That is, preferably, $\Delta_{3,MIN}$ does not occur at $R_{3HHMID}$. Preferably, $R_{3HHMID}$ does not coincide with the middle of the second annular region 40.

In some preferred embodiments, for example as shown in FIGS. 3–7, a second intermediate annular region 35 is disposed between the first annular region 30 and the second annular region 40, i.e. regions 30 and 40 at not immediately adjacent to one another. Preferably, the second intermediate annular region 35 is immediately adjacent the first annular region 30, i.e. region 35 preferably begins at radius $R_2$. Preferably, the second intermediate annular region 35 is immediately adjacent the second annular region 40. In preferred embodiments, the second intermediate annular region 35 ends at radius $R_{i2}$ and has a width $W_{i2}$, as illustrated in FIG. 3, and is disposed at a midpoint $R_{i2MID}$, and has a non-negative relative refractive index percent, $\Delta_{i2}\%(r)$, with a maximum value of the relative refractive index percent, $\Delta_{i2,MAX}$ which is preferably less than 0.1%, even more preferably less than 0.05%. In these embodiments, the radial width of the second annular region 40, $W_3$, is defined to be $R_3-R_{i2}$, i.e. $R_{3A}=R_{i2}$.

In other preferred embodiments, for example as shown in FIG. 8, the second annular region 40 is disposed immediately adjacent the first annular region 30. That is, no intermediate annular region is present between the first annular region 30 and the second annular region 40. In these embodiments, the radial width of the second annular region 40, $W_3$, is defined to be $R_3-R_2$, i.e. $R_{3A}=R_2$.

The profile volume of the optical fiber, or any portion thereof, is defined by:

$$\int_{r_o}^{r_f} \Delta(r) r\, dr$$

wherein $r_o$ and $r_f$ are the radii at the beginning and the end, respectively, of the portion of the fiber for which a profile volume is calculated. Thus, the profile volume of a particular region or segment starting at a radius $r_0$ and having a width w is defined by:

$$V = \int_{r_0}^{r_0+w} \Delta(r) r\, dr$$

and for a region of an optical fiber having a profile segment which is described by an alpha parameter, the refractive index is defined by:

$$\Delta(r) = \Delta_0 \left[1 - \left(\frac{r-r_0}{w}\right)^\alpha\right]$$

where $\Delta_0$ is the relative refractive index at $r_0$, and the segment volume is:

$$V = \Delta_0 r_0 w\left(\frac{\alpha}{\alpha+1}\right) + \frac{1}{2}\Delta_0 w^2\left(\frac{\alpha}{\alpha+2}\right).$$

The above-described definitions of physical parameters apply to the remaining Figures where appropriate. The tables below which list the physical properties of the fibers disclosed herein include the calculated profile volumes in units of %-$\mu$m$^2$.

Dispersion is given in units of ps/nm/km. Dispersion slope, or "slope" is given in ps/nm$^2$/km.

Referring to FIGS. 3–8, the optical fiber 10 disclosed herein comprises: central region 20; a first annular region 30 surrounding the central region 20; a second annular region 40 surrounding the first annular region 30; and an outer annular cladding region 100 immediately adjacent and surrounding the second annular core region 40. Thus, the optical fiber 10 preferably comprises at least three core segments: center region 20 having a positive relative refractive index, first annular region 30 having a positive relative refractive index, and second annular region 40 having a negative relative refractive index. The relative refractive index difference with respect to the cladding in percent, or relative refractive index $\Delta\%(r)$, can be plotted versus radius. The relative refractive index $\Delta_1\%(r)$ of the central core region preferably has an alpha ($\alpha$) profile. Preferably, $\alpha<8$, more preferably $1<\alpha<7$.

Preferably, $\Delta\%(r)$ is greater than or equal to 0% for all regions for radii up to 14 microns, more preferably up to 12 microns.

Central region 20 comprises a maximum relative refractive index or peak $\Delta_1\%$, $\Delta_{1,MAX}$, less than about 0.7, more preferably between about 0.4 and about 0.6, and ends at a radius $R_1$ of preferably between about 2 and about 6 microns, more preferably between about 3 and about 5 microns, as defined by the straight line approximation wherein a straight line (21) passes tangentially through the half-peak height of the central region 20 (at $R_{1HH}$) and is extrapolated to intersect with the $\Delta\%=0$ axis. Preferably, the half-peak height radius is between about 2 and 4 microns, more preferably between about 2.5 and 3.5 microns.

Referring to FIGS. 3–7, in a first set of preferred embodiments, the optical fiber 10 disclosed herein comprises: central region 20; a first intermediate annular region 25 immediately adjacent and surrounding the central region 20, a first annular region 30 immediately adjacent and surrounding the first intermediate annular region 25; a second intermediate annular region 35 immediately adjacent and surrounding the first annular region 30, a second annular region 40 immediately adjacent and surrounding the second intermediate annular region 35; and an outer annular cladding region 100 immediately adjacent and surrounding the second annular core region 40. Thus, in the first set of preferred embodiments, the optical fiber 10 preferably comprises five core segments: center region 20, first intermediate annular region 25, first annular region 30, second intermediate annular region 35, and second annular region 40.

Referring to FIG. 8, in a second set of preferred embodiments, the optical fiber 10 disclosed herein comprises: central region 20; a first intermediate annular region 25 immediately adjacent and surrounding the central region 20, a first annular region 30 immediately adjacent and surrounding the first intermediate annular region 25; a second annular region 40 immediately adjacent and surrounding the first annular region 20; and an outer annular cladding region 100 immediately adjacent and surrounding the second annular region 40. Thus, in the second set of preferred embodiments, the optical fiber 10 preferably comprises four core segments: center region 20, first intermediate annular region 25, first annular region 30, and second annular region 40.

EXAMPLES 1 THROUGH 6

Table 1 lists the physical parameters of first through sixth embodiments (Examples 1–6) of the optical fiber 10 disclosed herein. The relative refractive index profiles of Examples 1–6 are represented by the profiles shown in FIGS. 3–7, respectively, with the corresponding entries for the physical parameters of a particular profile being found in Table 1. The central region of each of the relative refractive index profiles in FIGS. 3–7 has an alpha profile shape. Table 2 lists the optical properties of Examples 1–6.

FIG. 9 illustrates the dispersion of the optical fibers of Examples 1–6 at wavelengths from 1525 nm to 1625 nm.

TABLE 1

| | Example | | | | | |
|---|---|---|---|---|---|---|
| | 1 | 2 | 3 | 4 | 5 | 6 |
| $\Delta_{1,MAX}$ | 0.50 | 0.50 | 0.52 | .54 | .52 | .52 |
| $R_{1HH}$ | 3.0 | 3.0 | 2.95 | 2.85 | 2.9 | 2.95 |
| $R_1$ | 3.7 | 3.7 | 3.7 | 3.9 | 3.7 | 3.7 |
| $\alpha_1$ | 4.5 | 4.4 | 3 | 2 | 3 | 3 |
| $\Delta_{i1MAX}$ | 0.04 | 0.03 | 0.03 | 0.025 | 0.025 | 0.025 |
| $\Delta_{i1MIN}$ | 0.03 | 0.02 | 0.015 | 0.015 | 0.005 | 0.005 |
| $|\Delta_{i1}|_{MAX}$ | 0.04 | 0.03 | 0.03 | 0.025 | 0.025 | 0.025 |
| $|\Delta_{i1}|_{MIN}$ | 0.03 | 0.02 | 0.015 | 0.015 | 0.005 | 0.005 |
| $R_{i1}$ | 7.0 | 6.0 | 6.1 | 6.1 | 6.1 | 6.1 |
| $W_{i1}$ | 3.3 | 2.3 | 2.4 | 2.2 | 2.4 | 2.4 |
| $R_{i1,MID}$ | 5.35 | 4.85 | 4.9 | 5.0 | 4.9 | 4.9 |
| $\Delta_{2,MAX}$ | 0.175 | 0.1 | 0.16 | 0.16 | 0.17 | 0.13 |
| $R_{2HHA}$ | 7.6 | 7.0 | 6.75 | 6.75 | 6.65 | 6.8 |
| $R_{2HHB}$ | 10.0 | 11.65 | 9.65 | 9.65 | 9.75 | 10.2 |
| W2HH | 2.4 | 4.65 | 2.9 | 2.9 | 3.1 | 3.4 |
| $R_{2HHMID}$ | 8.8 | 9.3 | 8.2 | 8.2 | 8.2 | 8.5 |
| $R_2$ | 10.6 | 12.6 | 10.3 | 10.3 | 10.3 | 10.9 |
| $W_2$ | 3.6 | 6.6 | 4.2 | 4.2 | 4.2 | 4.8 |
| $|\Delta_{i2}|_{MAX}$ | 0.02 | 0.01 | 0.02 | 0.015 | 0.03 | — |
| $R_{i2}$ | 11.4 | 13.5 | 11.0 | 11.0 | 11.0 | — |
| $W_{i2}$ | 0.8 | 0.9 | 0.7 | 0.7 | 0.7 | — |
| $\Delta_{3,MIN}$ | −0.1 | −0.1 | −0.1 | −0.08 | −0.15 | −0.05 |
| $R_{3HHA}$ | 12.0 | 14.0 | 11.5 | 11.5 | 11.5 | 11.3 |
| $R_{3HHB}$ | 14.35 | 17.1 | 13.85 | 14.25 | 13.5 | 13.5 |
| W3HH | 2.35 | 3.1 | 2.35 | 2.75 | 2.0 | 2.2 |
| $R_{3HHMID}$ | 13.2 | 15.6 | 12.7 | 12.9 | 12.5 | 12.4 |
| $R_3$ | 15.3 | 18.2 | 14.7 | 15.3 | 14.0 | 14.4 |
| $W_3$ | 3.9 | 4.7 | 3.7 | 4.3 | 3.0 | 3.5 |
| Volume, 2nd annular region (40) | −4.7 | −3.0 | −2.3 | −3.4 | −3.7 | −2.2 |

TABLE 2

| | | Example | | | | | |
|---|---|---|---|---|---|---|---|
| | Units | 1 | 2 | 3 | 4 | 5 | 6 |
| Dispersion @ 1550 nm | ps/nm/km | 7.76 | 7.25 | 6.85 | 6.61 | 6.14 | 6.57 |
| Dispersion Slope @ 1550 nm | ps/nm2/km | 0.062 | 0.058 | 0.0655 | 0.067 | 0.068 | 0.06 |
| Kappa (=Disp/Slope) @ 1550 nm | nm | 125 | 125 | 105 | 99 | 90 | 110 |
| Effective Area @ 1550 nm | sq. microns | 66.2 | 64.1 | 65.8 | 66.9 | 66.7 | 63.1 |
| Mode Field Diameter @ 1550 nm | microns | 9.44 | 9.29 | 9.4 | 9.48 | 9.44 | 9.21 |
| Pin Array @ 1550 nm | dB | 5.5 | 6.5 | 6.4 | 7.5 | 7.3 | 6.8 |

TABLE 2-continued

| | Units | Example 1 | Example 2 | Example 3 | Example 4 | Example 5 | Example 6 |
|---|---|---|---|---|---|---|---|
| Lateral Load Wire Mesh @ 1550 nm | dB/m | 0.66 | 0.68 | 0.68 | 0.84 | 0.84 | 0.71 |
| Attenuation @ 1550 nm | dB/km | 0.196 | 0.197 | 0.197 | 0.196 | 0.197 | 0.197 |
| Zero Dispersion | nm | 1427 | 1427 | 1446 | 1452 | 1459 | 1441 |
| Dispersion @ 1310 nm | ps/nm/km | −8.3 | −8 | −9.6 | −10.2 | −10.4 | −8.9 |
| Pin Array @ 1600 nm | dB | 9.5 | 11.1 | 11 | 12.6 | 12.3 | 11.7 |
| LLWM @ 1600 nm | dB/m | 1.25 | 1.28 | 1.29 | 1.59 | 1.62 | 1.35 |
| Theor. LP11 Cutoff | nm | 1567 | 1542 | 1513 | 1526 | 1535 | 1542 |
| Theor. LP01 Cutoff | nm | >5000 | >5000 | >5000 | >5000 | >5000 | >5000 |
| Cabled Cutoff | nm | <1300 | <1300 | <1300 | <1300 | <1300 | <1300 |

Figure 10:
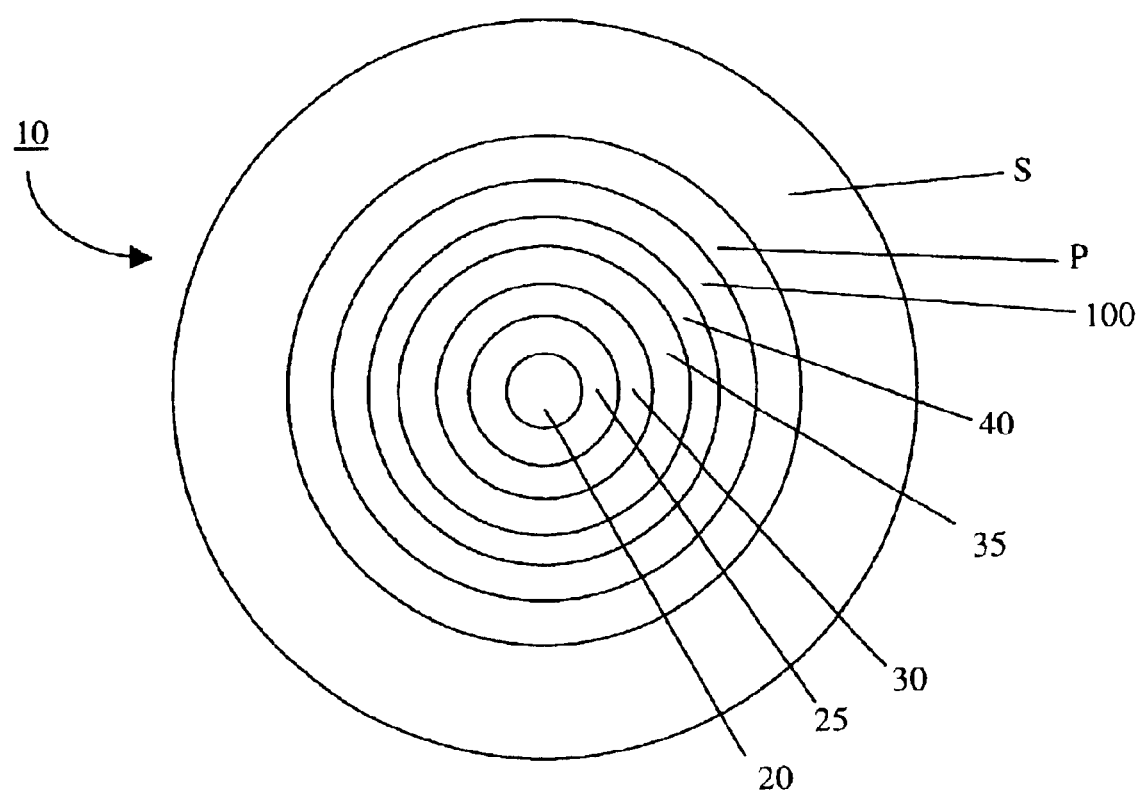
FIG. 10 is a schematic cross-sectional view of another preferred embodiment of an optical waveguide fiber as disclosed herein.

FIG. 10 is a schematic representation (not to scale) of an optical waveguide fiber 10 as disclosed herein having a central region (or first core segment) 20, a first intermediate annular region 25 immediately adjacent and surrounding the central region 20, a first annular region 30 immediately adjacent and surrounding the first intermediate annular region 25, a second intermediate annular region 35 immediately adjacent and surrounding the first annular region 30, a second annular region 40 immediately adjacent and surrounding the second intermediate annular region 35, and an outer annular cladding region or cladding or clad layer 100 immediately adjacent and surrounding the second annular region 40. A primary coating layer P surrounds the clad layer 100, and a secondary coating layer S surrounds the primary coating layer.

Various embodiments of the optical fiber disclosed herein could be made via OVD, PCVD, IVD, VAD, or MCVD methods, or by any other appropriate method known by the skilled artisan.

Optical fibers as disclosed herein having a refractive index profile including a core region with a positive relative refractive index profile, a first annular region with a positive relative refractive index profile, and a second annular region with a negative relative refractive index profile can exhibit lowered macrobending and microbending losses as well as reduced theoretical higher order mode cutoff wavelengths, especially as compared to other optical fibers having no second annular region with a negative relative refractive index profile. Experiments have shown that the measured (2 m) fiber cutoff wavelengths and cabled cutoff wavelengths are lower for the optical fibers discloses herein, especially as compared to other optical fibers having no second annular region with a negative relative refractive index profile. Measured and cabled cutoff wavelengths are lower than the theoretical cutoff wavelength value due to bending and/or mechanical pressure.

Various embodiments of the optical fibers disclosed herein were modeled based upon the relative refractive profiles of Examples 1, 3 and 4 described herein with variations in the annular region having a negative relative refractive index profile which was disposed radially outwardly from the two regions having a positive relative refractive index profile (i.e. in Examples 1, 3, and 4, core region and first annular region).

Figure 11:
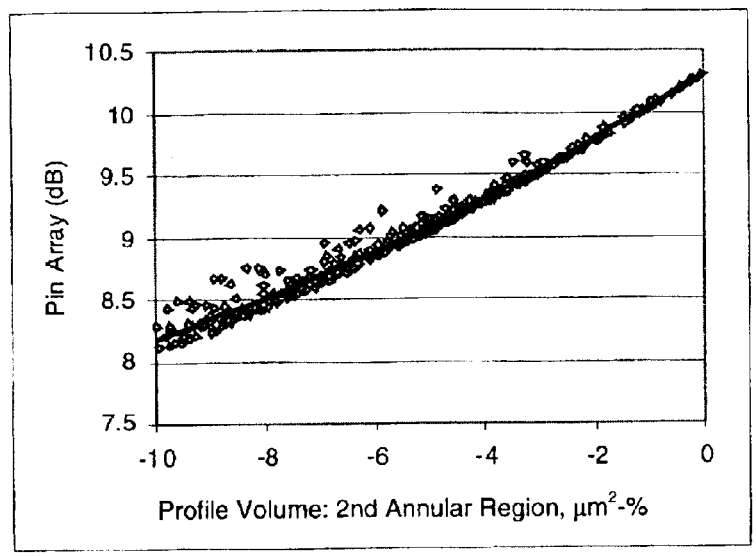
FIG. 11 shows the pin array at 1550 nm in dB for various embodiments of the optical fibers disclosed herein.

FIG. 11 shows the pin array at 1550 nm in dB for various embodiments of the optical fibers disclosed herein having a core region, a first intermediate annular region, and a first annular region as described for Example 1, wherein the size and/or shape of the second annular region (of negative relative refractive index) was varied to achieve profile volumes for the second annular region of between 0 and −10 $\mu m^2$-%. FIG. 11 shows that the pin array value generally decreases with more negative profile volumes for the second annular region.

Figure 12:
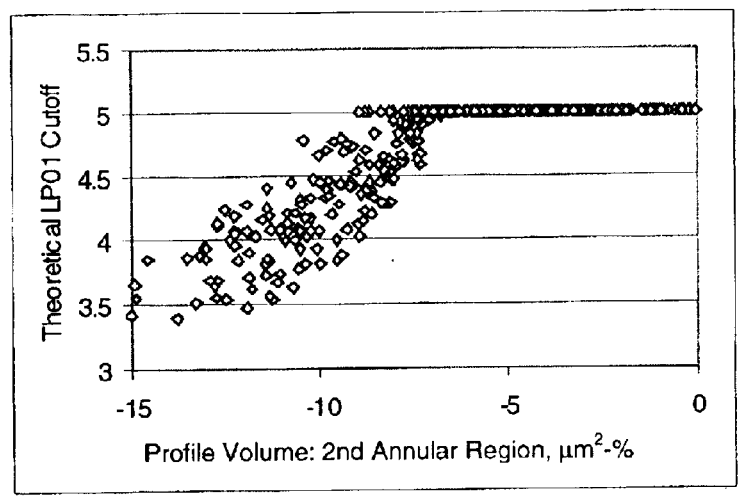
FIG. 12 shows the theoretical LP01 wavelength cutoff (in μm) for the various embodiments represented in FIG. 11.

FIG. 12 shows the theoretical LP01 wavelength cutoff (in $\mu m$) for the various embodiments represented in FIG. 11 (wherein a maximum value for LP01 cutoff of 5 $\mu m$ was graphed for values greater than or equal to 5 $\mu m$). FIG. 12 shows that the theoretical LP01 cutoff is at or above 5 $\mu m$ for profile volumes for the second annular region greater than about −7 $\mu m^2$-%, while the LP01 cutoff falls off sharply for profile volumes less than (i.e. more negative than) about −7 $\mu m^2$-%.

Figure 13:
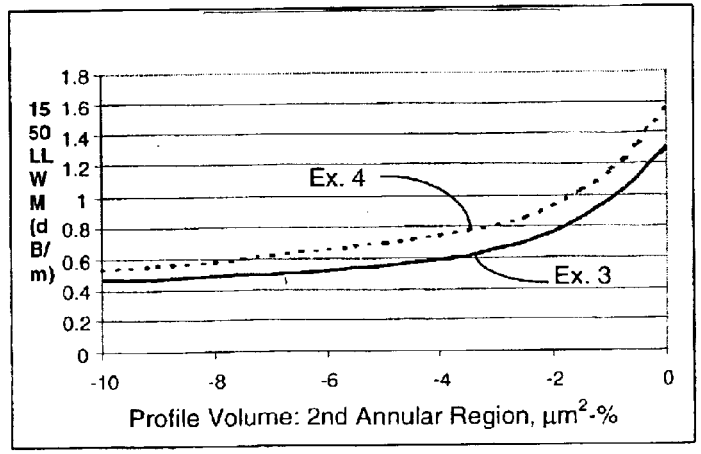
FIG. 13 shows the lateral load wire mesh values at 1550 nm (in dB/m), for various embodiments of the optical fibers disclosed herein having a core region, a first intermediate annular region, and a first annular region.

FIG. 13 shows the lateral load wire mesh values at 1550 nm (in dB/m), which is a measure of microbending losses, for various embodiments of the optical fibers disclosed herein having a core region, a first intermediate annular region, and a first annular region as described for Examples 3 and 4, wherein the size and/or shape of the second annular region (of negative relative refractive index) was varied to achieve profile volumes for the second annular region of between 0 and −10 $\mu m^2$-%. FIG. 13 shows that the improvements in microbending for second annular region profile volumes of between about −2 $\mu m^2$-% and about −6 $\mu m^2$-% as compared to profile volumes greater (i.e. more positive) than about −2 $\mu m^2$-%, however FIG. 13 demonstrates diminishing returns for further growth in the size of the second annular region profile volume (i.e. more negative profile volume values for that region).

FIG. 14 shows the theoretical LP11 wavelength cutoff (in $\mu m$) for the various embodiments represented in FIG. 13. FIG. 14 shows that the theoretical LP11 cutoff is decreased by between about 150 nm to 300 nm for second annular region profile volumes of between about −2 $\mu m^2$-% and about −6 $\mu m^2$-% as compared to profile volumes greater than about −2 $\mu m^2$-%, but further decreases in LP11 cutoff are not achieved as readily for further growth in (i.e. more negative) second annular region profile volumes (i.e. more negative than about −6 $\mu m^2$-%).

Thus, although second annular region profile volumes less than −6 $\mu m^2$-% generally yield lower pin array values, more negative second annular region profile volumes do not necessarily lead to further significant decreases in microbending or higher order mode cutoff values, but instead increasingly more negative (i.e. more negative than $-6\,\mu m^2$-%) second annular region profile volumes offer only relatively slightly lower microbending or relatively slightly higher order cutoff values, and moreover require larger dopant concentrations.

In a set of preferred embodiments of the optical fibers as disclosed herein, the second annular region is preferably disposed near or immediately adjacent the first annular region, which preferably occurs at a radius which is approximately equal to the mode field radius at selected wavelength (preferably about 1550 nm, corresponding to a central operating wavelength in systems that employ the optical fiber) for the fiber profiles disclosed herein, and most preferably, the entire second annular region is disposed between an inner radius, equal to about the mode field diameter at a selected wavelength (preferably about 1550 nm, corresponding to a central operating wavelength in systems that employ the optical fiber), and an outer radius equal to about 2.5 times the mode field diameter at a selected wavelength (preferably about 1550 nm, corresponding to a central operating wavelength in systems that employ the optical fiber), in order to enhance confinement of the fundamental mode and to improve resistance to bend losses. For embodiments that include an intermediate annular region disposed between the first and second annular regions, the intermediate annular region preferably has a maximum $|\Delta\%|$ of less than about 0.1%, more preferably less than about 0.05%, and a width of less than about 3 $\mu$m, more preferably less than about 2 $\mu$m, and most preferably less than about 1 $\mu$m. Preferably, the second annular region begins at a radius of between about 10 $\mu$m and about 15 $\mu$m. Preferably, the second annular region has a width of less than about 10 $\mu$m, especially in embodiments in which it is desirable to limit the overall dimensions of the core relative refractive index profile. Preferably, the second annular region has a width of greater than about 1 $\mu$m so as to avoid the requirement of a high concentration of dopants (such as a fluorine-containing compound or other downdopant) during manufacture of the optical fiber. In preferred embodiments, the second annular region has a width of between about 1 $\mu$m and about 10 $\mu$m. Preferably, the minimum relative refractive index of the second annular region, $\Delta_{5,MIN}$, is between about $-0.05\%$ and about $-0.2\%$, more preferably between about $-0.05\%$ and about $-0.15\%$.

All of the optical fibers disclosed herein can be employed in an optical signal transmission system, which preferably comprises a transmitter, a receiver, and an optical transmission line. The optical transmission line is optically coupled to the transmitter and receiver. The optical transmission line preferably comprises at least one optical fiber span, which preferably comprises at least one section of optical fiber.

The system preferably further comprises at least one amplifier, such as a Raman amplifier, optically coupled to the optical fiber section.

The system further preferably comprises a multiplexer for interconnecting a plurality of channels capable of carrying optical signals onto the optical transmission line, wherein at least one, more preferably at least three, and most preferably at least ten optical signals propagate at a wavelength between about 1260 nm and 1625 nm. Preferably, at least one signal propagates in one or more of the following wavelength regions: the 1310 nm window, the 1383 nm window, the S-band, the C-band, and the L-band.

In some preferred embodiments, the system is capable of operating in a coarse wavelength division multiplex mode wherein one or more signals propagate in at least one, more preferably at least two of the following wavelength regions: the 1310 nm window, the 1383 nm window, the S-band, the C-band, and the L-band.

In one preferred embodiment, the system comprises a section of optical fiber as disclosed herein having a length of not more than 20 km. In another preferred embodiment, the system comprises a section of optical fiber as disclosed herein having a length of greater than 20 km. In yet another preferred embodiment, the system comprises a section of optical fiber as disclosed herein having a length of greater than 70 km.

In one preferred embodiment, the system operates at less than or equal to about 1 Gbit/s. In another preferred embodiment, the system operates at less than or equal to about 2 Gbit/s. In yet another preferred embodiment, the system operates at less than or equal to about 10 Gbit/s. In still another preferred embodiment, the system operates at less than or equal to about 40 Gbit/s. In yet another preferred embodiment, the system operates at greater than or equal to about 40 Gbit/s.

It is to be understood that the foregoing description is exemplary of the invention only and is intended to provide an overview for the understanding of the nature and character of the invention as it is defined by the claims. The accompanying drawings are included to provide a further understanding of the invention and are incorporated and constitute part of this specification. The drawings illustrate various features and embodiments of the invention which, together with their description, serve to explain the principals and operation of the invention. It will become apparent to those skilled in the art that various modifications to the preferred embodiment of the invention as described herein can be made without departing from the spirit or scope of the invention as defined by the appended claims.

What is claimed is:

1. An optical waveguide fiber comprising:
a central region extending radially outward from the centerline and having a positive relative refractive index percent, $\Delta_1\%(r)$ with a maximum relative refractive index percent, $\Delta_{1,MAX}$;
a first annular region surrounding the central region and having a positive relative refractive index percent, $\Delta_2\%(r)$, with a maximum relative refractive index percent, $\Delta_{2,MAX}$;
a second annular region surrounding the first annular region and having a negative relative refractive index percent, $\Delta_3\%(r)$ with a minimum relative refractive index percent, $\Delta_{3,MIN}$, the second annular region extending from an inner radius, $R_{3A}$, to an outer radius, $R_3$; and
an outer annular cladding region surrounding the second annular region and having a relative refractive index percent, $\Delta_c\%(r)$;
wherein the mode field diameter at 1550 nm is greater than 9 $\mu$m;
wherein the inner radius of the second annular region, $R_{3A}$, is greater than the mode field diameter at 1550 nm;
wherein the outer radius of the second annular region, $R_3$, is less than or equal to 2.5 times the mode field diameter at 1550 nm; and
wherein the optical fiber has an effective area of greater than about 60 $\mu m^2$ at a wavelength of about 1550 nm, a dispersion at a wavelength of about 1550 nm between about 4 ps/nm-km and 10 ps/nm-km, a dispersion slope of less than 0.07 ps/nm²/km at a wavelength of about 1550 nm, and a zero-dispersion wavelength of less than about 1500 nm.

2. The optical waveguide fiber of claim 1 wherein the profile volume of the second annular region is between about −2%-μm² and about −6%-μm².

3. The optical waveguide fiber of claim 1 wherein $\Delta_1\%(r)$ has an alpha profile shape with an alpha less than 8.

4. The optical waveguide fiber of claim 1 wherein $\Delta_{2,MAX}$<0.4%.

5. The optical waveguide fiber of claim 1 wherein the first annular region has a width of less than about 5 μm.

6. The optical waveguide fiber of claim 1 further comprising a first intermediate annular region disposed between the central region and the first annular region and having a relative refractive index percent, $\Delta_{i1}\%(r)$, with a maximum absolute value of the relative refractive index percent, $|\Delta_{i1}|_{max}$, wherein $|\Delta_{i1}|_{max}$<0.1%, and wherein first intermediate annular region abuts both the central region and the first annular region.

7. The optical waveguide fiber of claim 6 wherein the first intermediate annular region extends to a radius of between about 5 μm and about 8 μm.

8. The optical waveguide fiber of claim 6 wherein $|\Delta_{i1,MAX}|$<0.05%.

9. The optical waveguide fiber of claim 6 wherein the first intermediate annular region has a non-negative relative refractive index percent.

10. The optical waveguide fiber of claim 1 wherein $\Delta_{1,MAX}$ is between about 0.40% and about 0.60%.

11. The optical waveguide fiber of claim 1 wherein the central region extends to a radius of between about 3 μm and about 5 μm.

12. The optical waveguide fiber of claim 1 wherein the first annular region extends to a radius of between about 10 μm and about 14 μm.

13. The optical waveguide fiber of claim 1 wherein −0.2%<$\Delta_{3,MIN}$<−0.05%.

14. The optical waveguide fiber of claim 1 wherein the optical fiber has a dispersion at a wavelength of about 1550 nm of between about 5 ps/nm/km and about 9 ps/nm/km, and wherein the optical fiber has a dispersion slope of less than 0.07 ps/nm²/km at a wavelength of about 1550 nm.

15. The optical waveguide fiber of claim 1 wherein the optical fiber has a zero-dispersion wavelength of less than about 1500 nm.

16. The optical waveguide fiber of claim 1 wherein the optical fiber has a zero-dispersion wavelength of less than about 1450 nm.

17. The optical waveguide fiber of claim 1 further comprising a second intermediate annular region disposed between the first annular region and the second annular region and having a relative refractive index percent, $\Delta_{i2}\%(r)$, with a maximum absolute value of the relative refractive index percent, $|\Delta_{i2,MAX}|$, wherein $|\Delta_{i2,MAX}|$<0.1%, and wherein second intermediate annular region abuts both the first annular region and the second annular region.

18. The optical waveguide fiber of claim 1 wherein the second annular region has a width of less than about 4 μm.

* * * * *